United States Patent Office 3,048,980
Patented Aug. 14, 1962

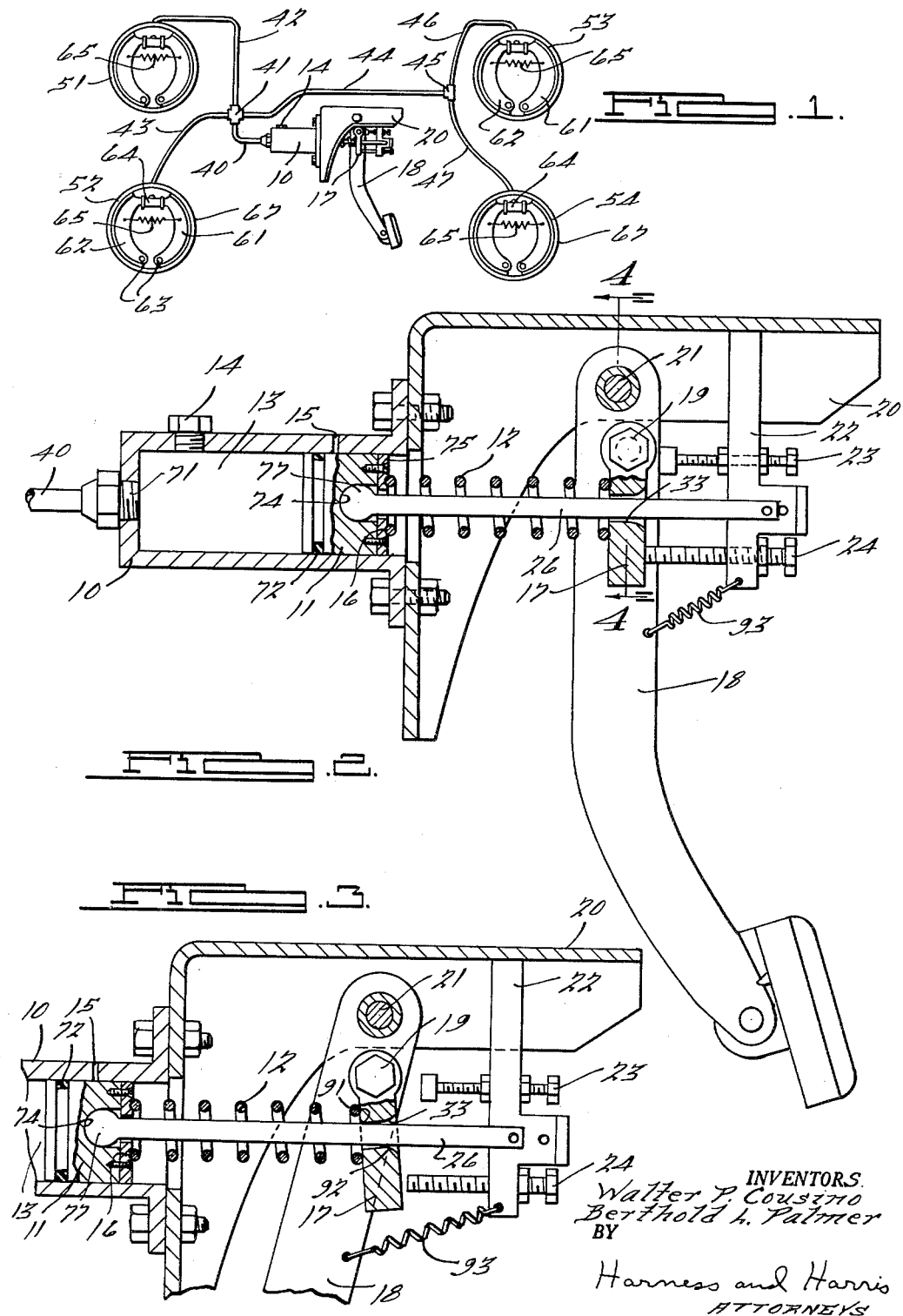

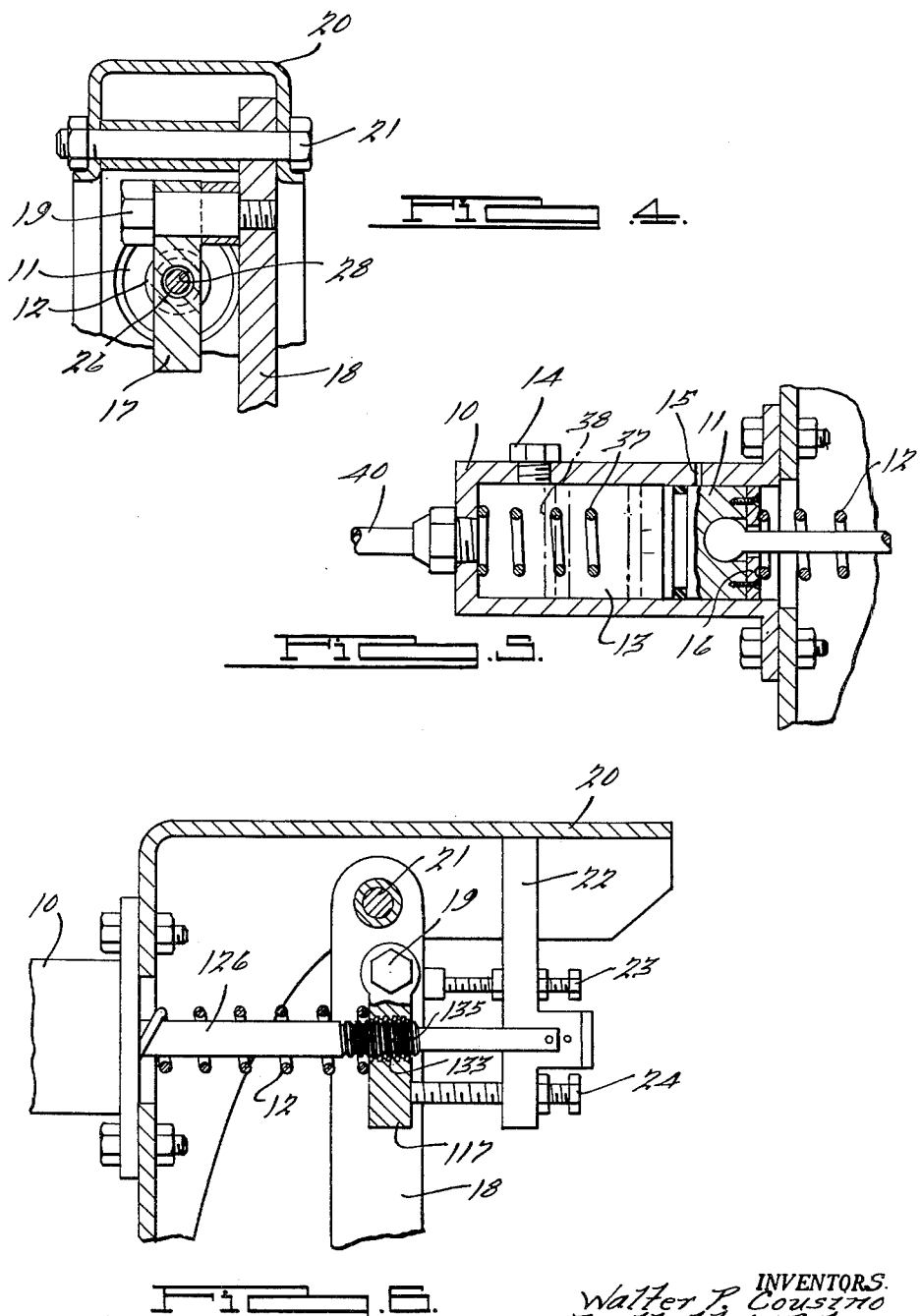

3,048,980
BRAKE MASTER CYLINDER
Walter P. Cousino, St. Clair Shores, and Berthold L. Palmer, Warren, Mich., assignors to Chrysler Corporation, Highland Park, Mich., a corporation of Delaware
Filed June 26, 1961, Ser. No. 119,567
10 Claims. (Cl. 60—54.6)

This invention relates to a pressure fluid operated brake system and is particularly concerned with the elimination of the fluid reservoir that is usually attached to the master cylinder of a pressure fluid brake system.

It is a primary object of this invention to provide a pressure fluid brake system master cylinder having a resilient load applying means to keep the brake lines under a predetermined pressure and to automatically eliminate free pedal travel in the brake applying linkage while at the same time eliminating the need for a brake fluid reservoir on the master cylinder.

It is still another object of this invention to provide an improved, reduced cost, simplified, pressure fluid brake system master cylinder that is adapted to eliminate brake pedal free play and improve the speed of brake application with minimum brake pedal travel.

It is still another object of this invention to provide a pressure fluid brake system master cylinder that eliminates a fluid reservoir but includes means to keep the brake system under a constant brake applying load.

It is still another object of this invention to apply a constantly acting brake applying load to a master cylinder piston with safety means to prevent bottoming of the master cylinder piston in the event a leak should develop in the fluid system.

It is still another object of this invention to provide bleed means in a reservoir-less master cylinder that will prevent brake shoe drag in the event heat should cause undue expansion of the constantly pressurized brake applying fluid.

Other objects and advantages of this invention will be found to be readily apparent from a reading of the following description and a consideration of the related drawings wherein:

FIG. 1 is a diagrammatic view of a motor vehicle hydraulic brake system having a master cylinder embodying this invention connected to the brake system;

FIG. 2 is an enlarged sectional elevational view of the brake master cylinder shown in FIG. 1, the brake pedal being in brake released position;

FIG. 3 is a fragmentary, sectional, elevational view similar to FIG. 2, but showing the brake pedal depressed to brake applying position;

FIG. 4 is a fragmentary sectional elevational view taken on the line and in the direction of the arrows 4—4 of FIG. 2;

FIG. 5 is a fragmentary sectional elevational view of a modified form of brake master cylinder embodying this invention; and FIG. 6 is another fragmentary, sectional, elevational view disclosing a still further modification of this type of brake master cylinder mechanism.

FIG. 1 of the drawings shows diagrammatically a pressure fluid operated motor vehicle braking system wherein the brake master cylinder 10 is connected by a discharge pipe 40 to a branch coupling 41 from which the wheel cylinder supply lines 42, 43 and 44 extend. Branch lines 42 and 43 are connected to the wheel cylinders 64 of the front wheel brakes 51 and 52. Each of the front wheel brakes, as well as the rear wheel brake assemblies 53 and 54, comprise a pair of brake shoes 61 and 62 pivotally anchored at 63 to the backing plate 67. The toe ends of the pivotally mounted brake shoes 61 and 62 are connected to a fluid pressure operated wheel cylinder 64 that is adapted to expand the brake shoes 61 and 62 into contact with the brake drum (not shown) that extends about the outer periphery of the brake shoes 61 and 62. A tension spring 65 extends between each pair of brake shoes 61, 62 to retract the shoes from engagement with the associated brake drum. The fluid pressure branch line 44 extends rearwardly to a fitting 45 from which the rear wheel lines 46 and 47 diverge. Lines 46 and 47 are connected to the wheel cylinders 64 of the rear wheel brake assemblies 53 and 54. The brake master cylinder 10 that is associated with the braking system shown in FIG. 1 embodies this invention and it is this master cylinder assembly that will now be described.

It is the aim of this invention to provide a brake master cylinder and associated system that will reduce brake pedal free play or free travel to a minimum. It is also an aim of this system to simplify the brake master cylinder by the elimination of the fluid reservoir that is usually associated with the master cylinder of a pressure fluid brake system. This system is a closed system having a relatively small size cylinder 10 that reciprocatably mounts a piston 11 that is kept under a constant minimum pressure by a compressed load spring 12. Brake fluid can be supplied to the cylinder bore 13 through the fill plug 14. If due to heat the fluid in the brake system should expand the piston 11 will be forced rightwardly by the expanding fluid in the bore 13 until it uncovers the vent hole 15 which will permit any excess of fluid in the system to bleed out of the vent hole 15. This brake system is constantly pressurized by the compression spring 12. Spring 12 extends between the grooved seat 16 in the outer end of the piston 11 and the pivoted locking lever 17 that is mounted on the brake pedal arm 18 by the bolt 19. Brake pedal 18 is pivotally supported on a dashboard or firewall mounted bracket 20 by means of the pivot bolt 21. Mounted on a depending flange 22 of the bracket 20 are a pair of set screws 23, 24. The set screw 23 is engageable with and limits the released position of the brake pedal 18. The set screw 24 is arranged to set the released position of the pivoted locking lever 17. From FIG. 2 it is clear that the push rod 26, that is used to actuate the piston 11, extends through an opening 33 in the pivoted latching lever 17.

With the arrangement described it is thought to be obvious that when the brake pedal 18 is swung forwardly (see FIG. 3) that the latching lever 17 will be tilted or cocked with respect to the push rod 26 and under such a condition there is a thrust transmitting connection established between the brake pedal 18 and push rod 26 which is utilized to move the piston 11 leftwardly. Tilting of the lever 17 causes a biting, thrust transmitting engagement of the lever 17 with the push rod 26 at the points 91, 92 (see FIG. 3). When the brake pedal operating force is removed then the pedal 18 and its supported locking lever 17 are returned to the released positions where the set screw 24 positions the locking lever 17 so as to disestablish the thrust transmitting connection between the lever 17 and push rod 26. A pedal return spring 93 can be used to assist in the retraction of pedal 18 but this is not absolutely necessary because the load spring 18 will act to return pedal 18 to released position. Because of the compression of the spring 12 between the lever 17 and the piston 11, there will always be a certain loading on the piston 11 acting to apply the brakes. This spring load on piston 11 eliminates the free travel of the brake pedal.

This master cylinder 10 which mounts the reciprocable piston 11 is essentially a cup-shaped stamping or casting that has the pressure fluid outlet line 40 connected thereto by an appropriate port 71. The piston 11 has a peripherally extending seal 72 that may be an O-ring of circular, square, D-shaped or similar cross sectional configuration. The outwardly exposed end face of the piston 11 has a suitably shaped recess 74 to journal the ball end 77 of the thrust rod 26. The ball end of the thrust rod 26 may be locked to the piston 11 by means of a cover plate 75. The cover plate 75 has the recessed formation 16 that seats the left end of the compression spring 12. It will be noted that the overflow bleed vent 15 is normally covered by the piston 11 so as to prevent leakage of any of the fluid that is trapped within the closed cylinder chamber 13. In the event heat should cause material expansion of the brake fluid in the brake applying system then the piston 11 may be forced toward the right to uncover the bleed port 15 and release pressure fluid until the system readjusts itself to the particular temperature that has caused the fluid expansion.

FIGS. 2 and 3 clearly show the normal clearance between the push rod 26 and the walls of the opening 33 through the latching lever 17. FIG. 2 shows the normal arrangement of the latching lever 17 with respect to the piston push rod 26 when the brakes are released. FIG. 3 shows that on depression of the brake pedal 18 forward swinging movement of the lever 18 causes a cocking of the latching lever 17 with respect to the push rod 26 such that the push rod is then lockingly gripped by the lever 17 such that any additional forward swinging of the brake pedal 18 will simultaneously cause forward or leftward movement of the push rod 26 and the attached piston 11 whereby the pressure fluid in the cylinder chamber 13 will effect application of the brake shoes in the conventional manner. On release of brake applying pressure to the brake pedal 18 the compressed load spring 12 will swing the brake pedal 18 rightwardly or in a counter clockwise direction so as to reduce the brake applying pressure transmitted to the wheel brake cylinders 64. The set screw 23 limits the counterclockwise swinging movement of the brake pedal 18 and the set screw 24 engages the locking lever 17 so as to hold the locking lever 17 in a substantially vertical position where it is disengaged from the push rod 26.

It is thought to be obvious from the preceding description of the brake system shown in FIGS. 1 through 4 that the fluid trapped in cylinder bore 13 and in the associated brake lines is normally under a continuously acting pressure developed by the compressed spring 12. The spring 12 is continuously acting to apply the brake shoe 61, 62 which action is opposed by the brake shoe return springs 65 which are tensioned between each of the pairs of brake shoes 61, 62. As a result of the action of the spring 12 the brake fluid in the brake system takes up any free play in the system so that the brake pedal is always available to immediately apply the brakes with a minimum of application time. By the elimination of the reservoir and associated porting that is usually connected to the brake master cylinder, this construction provides a simplified, economical, brake master cylinder assembly that lends itself to immediate brake application in minimum time.

FIG. 5 shows a modification of the master cylinder 10 wherein a safety spring 37 is mounted in the left end of the cylinder bore 13 so as to normally limit the leftward movement of the piston 11 by the compressed spring 12. The safety spring 37 can be either mounted on the cylinder bore as shown or it can be carried by the left end of the piston 11. In the event a leak should develop in the conduit system of this brake mechanism then it is possible that the compressed spring 12 would urge the piston 11 leftwardly until it would seat against the left end wall of the cylinder 10. However, with the spring 37 mounted in the chamber 13 it is thought to be obvious that even if a leak should develop in the piping system the spring 12 would only move the spring 11 leftwardly until the spring 37 has been closed to such an extent that it equals or balances the force of the compression spring 12. The leftward position of the piston 11 is indicated by the reference numeral 38. Thus, it will be seen that there will always be a certain amount of additional leftward travel of the piston 11 to provide a braking action even if there should be a leak develop in the piping of the braking system.

FIG. 6 shows a modified form of locking lever 117 and push rod 126. The other reference numerals used in the FIG. 6 embodiment of the invention are identical to the reference numerals used in FIGS. 1 through 4 because the parts are identical in the two forms. In the FIG. 6 form of the invention the right end portion of the push rod 126 may include relatively large buttress threaded formations 135 that are adapted to be suitably engaged by a threaded formation 133 on the interior walls of the bore that extends into the locking lever 117. The threaded formations on the push rod 126 and the locking lever 117 provide a non-slip means that positively transmits thrust between the lever 18 and push rod 126 when the lever 18 is depressed. Obviously, other types of threaded or friction grip means could be used in place of the engageable thread formations 133, 135.

We claim:

1. A pressure fluid brake applying master cylinder comprising a support, a cylinder mounted on said support having a port connectible to a pressure fluid operated brake applying means, a piston axially reciprocable in the cylinder bore, a push rod at one end of said cylinder engaged with said piston to transmit thrust thereto in the direction of the cylinder axis, a brake applying pedal pivotally mounted on said support having portions arranged for movement towards and away from said cylinder one end, a locking means pivotally mounted on said support having means to lockingly engage a portion of said push rod, and a compressed resilient means extending between said piston and said support acting to apply a continuous force to the piston to effect axial movement thereof in a direction away from said pedal, movement of said pedal portions towards said cylinder one end causing said locking means to lockingly engage said push rod and transmit the movement of the pedal to said piston.

2. A pressure fluid brake applying master cylinder comprising a support, a cylinder mounted on said support having a port connectible to a pressure fluid operated brake applying means, a piston axially reciprocable in the cylinder bore, a push rod at one end of said cylinder engaged with said piston to transmit thrust thereto in the direction of the cylinder axis, a brake applying pedal pivotally mounted on said support having portions arranged for movement towards and away from said cylinder one end, a stop means to limit pivotal movement of said pedal away from said cylinder one end, a locking means pivotally mounted on said support having an aperture therethrough matingly receiving a portion of said push rod, and a compressed resilient means extending between said piston and said support acting to apply a continuous force to the piston to effect axial movement thereof in a direction away from said pedal, movement of said pedal portions towards said cylinder one end causing said locking means to lockingly engage said push rod and transmit the movement of the pedal to said piston.

3. A pressure fluid brake applying master cylinder comprising a support, a cylinder mounted on said support having a port connectible to a pressure fluid operated brake applying means, a piston axially reciprocable in the cylinder bore, a push rod projecting axially from one end of said cylinder and engaged with said piston to transmit thrust thereto, a brake applying pedal pivotally mounted on said support having portions arranged for movement towards and away from said cylinder one end, a stop means to limit pivotal movement of said pedal away from said cylinder one end, a locking means mounted on said pedal having means to lockingly engage a portion of said push rod, a stop means on said support to establish the rod released position of said locking means, and a compressed resilient means extending between said piston and said pedal acting to apply a continuous force to the piston to effect axial movement thereof in a direction away from said pedal, movement of said pedal portions towards said cylinder one end causing said locking means to lockingly engage said push rod and transmit the movement of the pedal portions to said piston.

4. A pressure fluid brake applying master cylinder comprising a support, a cylinder mounted on said support having a port connectible to a pressure fluid operated brake applying means, a piston axially reciprocable in the cylinder bore, a push rod at one end of said cylinder engaged with said piston to transmit axial thrust thereto, a brake applying pedal pivotally mounted on said support having portions engaged for movement towards and away from said cylinder one end, a stop means to limit pivotal movement of said pedal away from said cylinder one end, a locking means pivotally mounted on said pedal having an aperture therethrough matingly receiving a portion of said push rod, a stop means on said support to establish the rod released position of said locking means, and a compressed resilient means extending between said piston and said locking means acting to apply a continuous force to the piston to effect axial movement thereof in a direction away from said pedal, movement of said pedal portions towards said cylinder one end causing said locking means to lockingly engage said push rod and transmit the movement of the pedal portions to said piston.

5. A pressure fluid brake applying master cylinder comprising a support, a cylinder mounted on said support having a port connectible to a pressure fluid operated brake applying means, a piston axially reciprocable in the cylinder bore, a push rod at one end of said cylinder engaged with said piston to transmit axial thrust thereto, a brake applying pedal pivotally mounted on said support having portions arranged for movement towards and away from said cylinder one end, a stop means to limit pivotal movement of said pedal away from said cylinder one end, a locking means pivotally mounted on said pedal having an aperture therethrough matingly receiving a portion of said push rod, a stop means on said support to establish the rod released position of said locking means, a compressed resilient means extending between said piston and said locking means acting to apply a continuous force to the piston to effect axial movement thereof in a direction away from said pedal, movement of said pedal portions towards said cylinder one end causing said locking means to lockingly engage said push rod and transmit the movement of the pedal portions to said piston, and means in said cylinder to limit axial movement of said piston by said compressed resilient means to a portion of the cylinder length.

6. A pressure fluid brake applying master cylinder comprising a support, a cylinder mounted on said support having a port connectible to a pressure fluid operated brake applying means, a piston axially reciprocable in the cylinder bore, a push rod at one end of said cylinder engaged with said piston to transmit axial thrust thereto, a brake applying pedal pivotally mounted on said support having portions arranged for movement towards and away from said cylinder one end, a stop means to limit pivotal movement of said pedal away from said cylinder one end, a locking means pivotally mounted on said pedal having an aperture therethrough matingly receiving a portion of said push rod, a stop means on said support to establish the rod released position of said locking means, a compressed resilient means extending between said piston and said locking means acting to apply a continuous force to the piston to effect axial movement thereof in a direction away from said pedal, movement of said pedal portions towards said cylinder one end causing said locking means to lockingly engage said push rod and transmit the movement of the pedal portions to said piston, and means in said cylinder to limit axial movement of said piston by said compressed resilient means to a portion of the cylinder length, said last mentioned means comprising a compressible stop mounted within said cylinder.

7. A pressure fluid brake applying master cylinder comprising a support, a cylinder mounted on said support having a port connectible to a pressure fluid operated brake applying means, a piston axially reciprocable in the cylinder bore, a push rod at one end of said cylinder engaged with said piston to transmit axial thrust thereto, a brake applying pedal pivotally mounted on said support having portions arranged for movement towards and away from said cylinder one end, a stop means to limit pivotal movement of said pedal away from said cylinder one end, a locking means pivotally mounted on said pedal having an aperture therethrough matingly receiving a portion of said push rod, a stop means on said support to establish the rod released position of said locking means, and a compressed resilient means extending between said piston and said locking means acting to apply a continuous force to the piston to effect axial movement thereof in a direction away from said pedal, movement of said pedal portions towards said cylinder one end causing said locking means to lockingly engage said push rod and transmit the movement of the pedal portions to said piston, said locking means comprising a tiltable lever having the edge portions around the lever aperture arranged to bitingly engage the adjacent portions of the push rod when the relative alignment between the lever and its supporting pedal is changed by movement of said pedal towards said one end of the cylinder.

8. A pressure fluid brake applying master cylinder comprising a support, a cylinder mounted on said support having a port connectible to a pressure fluid operated brake applying means, a piston axially reciprocable in the cylinder bore, a push rod at one end of said cylinder engaged with said piston to transmit axial thrust thereto, a brake applying pedal pivotally mounted on said support having portions arranged for movement towards and away from said cylinder one end, a stop means to limit pivotal movement of said pedal away from said cylinder one end, a locking means pivotally mounted on said pedal having an aperture therethrough matingly receiving a portion of said push rod, a stop means on said support to establish the rod released position of said locking means, and a compressed resilient means extending between said piston and said locking means acting to apply a continuous force to the piston to effect axial movement thereof in a direction away from said pedal, movement of said pedal portions towards said cylinder one end causing said locking means to lockingly engage said push rod and transmit the movement of the pedal portions to said piston, said locking means comprising a tiltable lever having the edge portions around the lever aperture arranged to bitingly engage the adjacent portions of the push rod when the relative alignment between the lever and its supporting pedal is changed by movement of said pedal towards said one end of the cylinder, at least one of the bitingly engageable surfaces on said lever and push rod having anti-slip means thereon.

9. A pressure fluid brake applying master cylinder comprising a support, a cylinder mounted on said support having a port connectible to a pressure fluid operated brake applying means, a piston axially reciprocable in the cylinder bore, a push rod projecting axially from one end of said cylinder and engaged with said piston to transmit thrust thereto, a brake applying pedal pivotally mounted on said support having portions arranged for movement towards and away from said cylinder one end, a stop means to limit pivotal movement of said pedal away from said cylinder one end, a locking means mounted on said pedal having means to lockingly engage a portion of said push rod, a stop means on said support to establish the rod released position of said locking means, and a compressed resilient means extending between said piston and said pedal acting to apply a continuous force to the piston to effect axial movement thereof in a direction away from said pedal, movement of said pedal portions towards said cylinder one end causing said locking means to lockingly engage said push rod and transmit the movement of the pedal portions to said piston.

10. A pressure fluid brake applying master cylinder comprising a support, a cylinder mounted on said support having a port connectible to a pressure fluid operated brake applying means, a piston axially reciprocable in the cylinder bore between brake applying and brake released positions, a push rod at one end of said cylinder engaged with said piston to transmit axial thrust thereto, a brake applying pedal pivotally mounted on said support having portions arranged for movement towards and away from said cylinder one end, a stop means to limit pivotal movement of said pedal away from said cylinder one end, a locking means movably mounted on said support having portions adapted to be lockingly engaged with a portion of said push rod, and a compressed resilient means extending between said piston and said locking means acting to apply a continuous force to the piston to effect axial movement thereof in a direction away from said pedal, movement of said pedal portions towards said cylinder one end causing said locking means to lockingly engage said push rod and transmit the movement of the pedal portions to said piston, said cylinder having a fluid bleed vent outwardly of the normal released position of said piston.

References Cited in the file of this patent
UNITED STATES PATENTS
2,126,296   Weihe _____ Aug. 9, 1938